United States Patent [19]
Hilsenbeck et al.

[11] Patent Number: 5,872,073
[45] Date of Patent: Feb. 16, 1999

[54] REDUCED TERNARY MOLYBDENUM AND TUNGSTEN SULFIDES AND HYDROPROCESSING CATALYSIS THEREWITH

[75] Inventors: Shane J. Hilsenbeck; Robert E. McCarley; Glenn L. Schrader, all of Ames, Iowa; Xiaobing Xie, College Station, Tex.

[73] Assignee: The United States of America as represented by the United States Department of Energy, Washington, D.C.

[21] Appl. No.: 694,907

[22] Filed: Aug. 9, 1996

Related U.S. Application Data

[60] Provisional application No. 60/002,135 Aug. 10, 1995.
[51] Int. Cl.$^6$ .................. B01J 27/51; C01B 17/32
[52] U.S. Cl. .................. 502/220; 502/221; 502/222; 502/314; 502/315; 502/316; 502/317; 502/322; 502/323; 502/324; 502/328; 423/244.01; 423/560; 208/215; 208/216 R; 208/243
[58] Field of Search ................... 502/219, 220, 502/221, 222, 314, 315, 316, 317, 322, 323, 324, 328; 423/244.01, 560; 208/215, 216 R, 243

[56] References Cited

PUBLICATIONS

R. Chevrel and M. Sergent, in "Topics in Current Physics," (Ø. Fischer and M.B. Maple, Eds.), vol. 32, Ch. 2, Springer–Verlag, Heidelberg (1982).
O. Pena and M. Sergent, Prog. Solid St. Chem. 19, 165 (1989), "Rare Earth Based Chevrel Phases REMo$_6$X$_8$ . . . ".
P. J. Mulhern and R.R. Haering, Can. J. Phys. 62, 527 (1984), "Rechargeable Nonaqueous Lithium/Mo$_6$S$_8$ Battery".
K. F. McCarty; G. L. Schrader, *Ind. Eng. Chem. Prod. Res. Dev.,* 23 (1984) 519.
5 K. F. McCarty; J. W. Anderegg; G.L. Schrader, *J. Catal.,* 93 (1985) 375.
M. E. Eckman; J. W. Anderegg; G. L. Schrader, *J. Catal.,* 117 (1989) 246.
K. Yvon, in "Current Topics in Materials Science," (E. Kaldis, Ed.), vol. 3, p. 53, Elsevier, Amsterdam (1979).
R. Chevrel, M. Sergent, and J. Prigent, *Mater. Res. Bull.* 9, 1487 (1974).
R. Schöllhorn, M. Kümpers, and D. Plorin, *J. Less–Common Metals* 58, 55 (1978).
A. A. Opalovski and V. E. Fedorov, *Izv. Akad. Nauk SSSR Neorg. Mater.* 2, 443 (1966).
M. Spiesser and J. Rouxel, *C. R. Acad. Sci.* C265, 92 (1967).
R. Prins; V. H. J. DeBeer; G. A. Somorjai, *Catal. Rev.—Sci. Eng.,* 31 (1989) 1.
S. A. Kareem; R. Miranda, *J. Molec. Catal.,* 53 (1989) 275.
K. S. Nanjundaswamy; N. Y. Vasanthacharya; J. Gopalakrishnan; C. N. R. Rao, *Inorg. Chem.,* 26 (1987) 4286.
Rabiller–Baudry; M. Sergent; R. Chevrel, *Mater. Res. Bull.,* 26 (1991) 519.
F. W. Koknat, T. J. Adaway, S. I. Erzerum, and S. Syed, *Inorg. Nucl. Chem. Lett.* 16,307 (1980).
X. Zhang and R. E. McCarley, *Inorg. Chem.* 34, 2678 (1995).
S. J. Hilsenbeck, R. E. McCarley, and A. I. Goldman, *Chem. Materials* 7, 499 1995.
T. Saito, A. Yoshikawa, T. Yamagata, H. Imoto, and K. Unoura, *Inorg. Chem.,* 28, 3588 (1989).
Gocke et al. (E. Gocke, W. Schramm, P. Dolscheid, and R. Schöllhorn, *J. Solid State Chem.,* 70, 71 1987.
S.J. Hilsenbeck; V.G. Young, Jr. R.E. McLarley, *Inorg. Chem.,* 33 (1994) 1822.
Brauer, 14 G. Brauer, in "Handbuch der Preparativen Anorganischen Chemie," p. 371, F. Enke Verlag, Stuttgart (1975).
W. T. Elwell and W. F. Wood, in "Analytical Chemistry of Molybdenum and Tungsten," p.41, Pergamon Press, New York, (1971).
Chevrel et al. R. Chevrel, C. Rossel, and M. Sergent, *J. Less Common Met.,* 72, 31 (1980).
C. L. Lewis and W. L. Ott, *Analytical Chemistry of Nickel*, Pergamon Press, New York, 1970, Chapt. 6.
S. Yashonath; M. S. Hegde; P. R. Sarode; C. N. R. Rao; A. M. Umarji; G. V. Subba Rao, *Solid State Commun.,* 37 (1981) 325.
C. Stevens; T. Edmonds, *J. Catal.,* 37 (1975) 544.

*Primary Examiner*—Glenn Caldarola
*Assistant Examiner*—In Suk Bullock
*Attorney, Agent, or Firm*—Mark LaMarre; Thomas G. Anderson; William R. Moser

[57] ABSTRACT

New amorphous molybdenum/tungsten sulfides with the general formula $M^{n+}{}_{2x/n}(L_6S_8)S_x$, where L is molybdenum or tungsten and M is a ternary metal, has been developed. Characterization of these amorphous materials by chemical and spectroscopic methods (IR, Raman, PES) shows that the $(M_6S_8)^0$ cluster units are present. Vacuum thermolysis of the amorphous $Na_{2x}(Mo_6S_8)S_x \cdot yMeOH$ first produces poorly crystalline $NaMo_6S_8$ by disproportionation at 800° C. and well-crystallized $NaMo_6S_8$ at $\geq$ 900° C. Ion-exchange of the sodium material in methanol with soluble $M^{2+}$ and $M^{3+}$ salts (M=Sn, Co, Ni, Pb, La, Ho) produces the $M^{n+}{}_{2x/n}(Mo_6S_8)S_x \cdot yMeOH$ compounds. Additionally, the new reduced ternary molybdenum sulfides with the general formula $M^{n+}{}_{2x/n}Mo_6S_{8+x}(MeOH)_y$[MMOS] (M=Sn, Co, Ni) is an effective hydrodesulfurization (HDS) catalyst both as-prepared and after a variety of pretreatment conditions. Under specified pretreatment conditions with flowing hydrogen gas, the SnMoS type catalyst can be stabilized, and while still amorphous, can be considered as "Chevrel phase-like" in that both contain $Mo_6S_8$ cluster units. Furthermore, the small cation NiMoS and CoMoS type pretreated catalyst showed to be very active HDS catalysts with rates that exceeded the model unpromoted and cobalt-promoted $MoS_2$ catalysts.

14 Claims, 8 Drawing Sheets

REDUCED TERNARY MOLYBDENUM AND TUNGSTEN SULFIDES AND HYDROPROCESSING CATALYSIS THEREWITH

The United States Government has rights in this invention pursuant to Contract No.W-7405-Eng-82 between the U.S. Department of Energy and Ames Laboratory operated by Iowa State University.

This application claims priority from Provisional Application No. 60/002,135 filed on August 10, 1995. This application was filed during the term of the before-mentioned Provisional Application.

BACKGROUND OF THE INVENTION

Field of the Invention

This invention relates generally to molybdenum sulfide and tungsten sulfide catalysts. More particularly, this invention relates to a novel amorphous molybdenum sulfide and tungsten sulfide for use as a hydrodesulfirization catalyst. Further, this invention relates to a precursor for the formation of molybdenum and tungsten-based chevrel phase materials.

Description of Related Art

Introduction

The search for new HYDROPROCESSING catalysts has been stimulated by the demand for low sulfur fuels and feedstocks from petroleum and by the requirement of low aromatics content in diesel fuels and gasoline. Over the previous nearly 60 years, the Co(Ni)-Mo (sulfide) catalysts have been extensively developed and have become increasingly important in industrial hydrodesulfurization (HDS) processing. A new series of hydroprocessing catalysts has been reported based on a family of ternary molybdenum sulfides known as Chevrel phases. These compounds exhibit the general formula $M_xMo_6S_8$, where M, the "ternary" metal cation, can be one of over 40 different metals. Depending upon the extent of ternary metal incorporation, the molybdenum oxidation state of the Chevrel phases can be varied from +2 to +2.67.

The Chevrel phases of the general formula $M_xMo_6Y_8$ (M=ternary metal cation, $1 \leq x \leq 4$, Y=S, Se or Te), are an important class of compounds because of their interesting chemical and physical properties. Among these are numerous examples of high $H_{c2}$ superconductors (1), ordered magnetic phases (2), solid electrolytes (fast ion conductors) (3), and hydrodesulfurization catalysts (4). Structurally the compounds consist of 3-dimensionally interlinked $Mo_6Y_8$ cluster units sharing chalcogenide ions between bridging and terminal positions as indicated by the formulation $(Mo_6Y_2^iY_{6/2}^{i-a})Y_{6/2}^{a-i}$ (The terminology used here is given by A. SIMON, Chem. Unserer Zeit 10, 1 (1976)). The $Mo_6Y_8$ cluster unit is composed of six Mo atoms bonded to form an octahedron (as shown in FIG. 1). The bridging ligands Y which cap the faces of the octahedron are each bonded to three Mo atoms. Each Mo atom can form one additional bond directed radially outward from the cluster to a terminal ligand. The interlinking joins each cluster with six adjoining cluster units in a rhombohedral (sometimes lower symmetry) stacking. The ternary metal ions $M^{n+}$, with n=1 to 4, find positions within the interstices of this network in either large cation (e.g. $Pb^{2+}$, $Sn^{2+}$ or $La^{3+}$) or small cation (e.g. $Li^+$, $Cu^+$ or $Ni^{2+}$) sites, Electron transfer from the cations gives formal charges of 1- to 4- on the $Mo_6Y_8^{n-}$ anionic network, and consequently metal cluster electron (MCE) counts of 20 to 24 can be realized. Here the MCE consists of only the electrons remaining in the 4 d orbitals of Mo and used for Mo—Mo bonding after the valence levels of the S atoms are filled. The 20 electron case is realized in the binary phases $Mo_6Y_8$, of which the sulfide is metastable and must be prepared by indirect means; the selenide and telluride members are stable and easily prepared by direct combination of the elements.

The Chevrel phase compounds exhibited high activity and selectivity for HDS, in some cases even exceeding the values for unsupported Co—Mo catalysts. These reduced molybdenum sulfides show remarkable stability under the HDS conditions—low oxidation states are maintained and no decomposition or transformation to other Mo sulfides are noted for nearly all Chevrel phase compositions studied. The preparation of these catalysts involved solid state reactions at high temperatures (1000°–1300° C.). However, this high-temperature synthesis technique results in materials with very low surface areas. Therefore, lower temperature routes via solution precursors have been sought so that films, coatings, and small particles, either alone or on typical catalyst support materials, can be prepared.

A structural similarity was noted between $Mo_6Cl_{12}$ and the Chevrel phases in that both contain hexanuclear cluster units (although the overall structures of the two compounds are quite different). These $Mo_6Y_8$ units (FIG. 1) have an octahedron of molybdenum atoms with eight triply bridging atoms (Y=Cl or S) capping each face. Additionally, six terminal positions are located at the vertices of the octahedron and participate in the interlinkage of the clusters. These observations prompted studies of $Mo_6Cl_{12}$ sulfidation in an attempt to prepare isolated $Mo_6S_8L_6$ cluster units as precursors to the Chevrel phases.

Recently, we have found a low temperature synthetic route to new ternary molybdenum sulfides. Examination has shown these amorphous materials to be structurally similar to the Chevrel phases in that both contain $Mo_6S_8$ cluster units. Yet, in order to produce the Chevrel phases, these ternary molybdenum sulfides must undergo disproportionation ($M_{x/n}Mo_6S_{8+x} \rightarrow M_xMo_6S_8 + MoS_2 + M_nS$) or be treated under reducing conditions. The focus of this invention is on one member of this family, the ternary tin molybdenum sulfide (SnMoS) and the examination of its HDS capabilities under various pretreatment conditions. These results are then compared to the small cation MMoS (M=Co and Ni) materials under similar pretreatment conditions.

In addition, up to the present time, there has been no report concerning the successful preparation of the tungsten analogues $W_6Y_8$ or $M_xW_6Y_8$. It is generally understood that these compounds must be unstable with respect to disproportionation (into W and $WY_2$ or W, $WY_2$ and $MY_{n/2}$). Thus, if success is to be achieved, preparation of the tungsten analogues must be pursued by low temperature approaches. We have been successful in developing the chemistry of molecular complexes $M_6S_8L_6$ for both the molybdenum and tungsten cluster units and have sought to apply this in the development of low temperature routes to the ternary phases $M_xMo_6S_8$ and $M_xW_6S_8$ The following articles discuss research on Chevrel phase materials:

REFERENCES

1 R. CHEVREL AND M. SERGENT, in "Topics in Current Physics," (Ø. Fischer and M. B. Maple, Eds.), Vol. 32, Ch. 2, Springer-Verlag, Heidelberg (1982).

2 O. PENA AND M. SERGENT, *Prog. Solid St. Chem.* 19, 165 (1989).

3 P. J. MULHERN AND R. R. HAERING, *Can. J Phys.* 62, 527 (1984).

4 (a) K. F. McCarty; G. L. Schrader, *Ind. Eng. Chem. Prod. Res. Dev.*, 23 (1984)519.

(b) K. F. McCarty; J. W. Anderegg; G. L. Schrader, *J. Catal.*, 93 (1985) 375.

(c) M. E. Eckman; J. W. Anderegg; G. L. Schrader, *J. Catal.*, 117 (1989) 246.

5 K. YVON, in "Current Topics in Materials Science," (E. Kaldis, Ed.), Vol. 3, p. 53 Elsevier, Amsterdam (1979).

6 (a) R. CHEVREL, M. SERGENT, AND J. PRIGENT, *Mater. Res. Bull.* 9, 1487 (1974).

(b) R. SCHÖLLHORN, M. KÜMPERS, AND D. PLORIN, *J. Less-Common-Metals* 58, 55 (1978).

7 (a) A. A. OPALOVSKI AND V. E. FEDOROV, *Izv. Akad. Nauk SSSR Neorg. Mater.* 2,443 (1966).

(b) M. SPIESSER AND J. ROUXEL, *C. R. Acad. Sci.* C265, 92 (1967).

8 R. Prins; V. H. J. DeBeer; G. A. Somorjai, *Catal. Rev.-Sci. Eng.*, 31 (1989) 1

9 S. A. Kareem; R. Miranda, *J. Molec. Catal.*, 53 (1989) 275.

10 (a) K. S. Nanjundaswamy; N. Y. Vasanthacharya; J. Gopalakrishnan; C. N. R. Rao, *Inorg Chem.*, 26 (1987) 4286.

(b) M. Rabiller-Baudry; M. Sergent; R. Chevrel, *Mater. Res. Bull.*, 26 (1991) 519.

SUMMARY OF THE INVENTION

An object of this invention is to provide a class of compounds with molybdenum in a reduced oxidation state in order to provide increased catalytic activity.

Another object of this invention is to provide tungsten-based compounds analogous to Chevrel phases.

Another object of this invention is to provide a starting material which can be transformed into Chevrel phases at temperature lower than obtained in the art.

These and other objectives of the invention, which will become apparent from the following description, have been achieved by novel chemical compositions, having an amorphous structure, comprising the structure $M^{n+}_{2x/n}(L_6S_8)S_{x}$; wherein n is 1, 2, or 3; and x is from 0.5 to 1.5. Preferably x is for 1 to 1.5. L can be molybdenum or tungsten. M can be any ternary metal selected from the group consisting of lithium, sodium, potassium, rubidium, cesium, magnesium, calcium, strontium, barium, titanium, vanadium, chromium, manganese, iron, ruthenium, osmium, cobalt, iridium, nickel, palladium, platinum, copper, zinc, silver, gold, cadmium, mercury, gallium, indium, thallium, tin, lead, bismuth, scandium, lanthanum, yttrium, cerium, praseodymium, neodymium, samarium, europium, gadolinium, terbium, erbium thulium, dysprosium, holmium, ytterbium, and lutetium. Preferably M is a ternary metal selected from the group consisting of sodium, tin, cobalt, nickel, lead, lanthanum, and holmium.

The chemical compositions of this invention also include the precursor for the above compound, which precursor compounds comprise $M^{n+}_{2x/n}(Mo_6S_8)S_x \cdot yR$. M is selected from the group consisting of sodium, tin, cobalt, nickel, lead, lanthanum, and holmium. R is methanol or other suitable solvent molecule, known in the chemical arts, such as acetonitrile, tetrahydrofuran (THF), propionitrile, butanol, propanol, or other alcohol, and amines; n is 1, 2, or 3; x is from 0.5 to 1.5; and y is 4 to 5.

A catalyst comprising a suitable substrate and the chemical compounds of this invention deposited onto the substrate can be made. Any suitable substrates known in field of catalystis can be used.

Also, a method for making the chemical compositions $M^{n+}_{2x/n}(L_6S_8)S_x$; having an amorphous structure, where L is molybdenum or tungsten; M is selected from the group consisting of sodium, tin, cobalt, nickel, lead, lanthanum, and holmium; n is 1, 2, or 3; and x is from 1 to 1.5, is presented. The method comprises, first reacting $L_6Cl_{12}$ and an alkali metal sulfide or hydrosulfide in a suitable solvent to produce a first reaction product. The first reaction product is then filtered to separate the first reaction product from the solvent. Next, the first reaction product is extracted with a second suitable solvent to remove the alkali metal chloride to form a second reaction product. The first reaction product reacts with the solvent to produce the second reaction product. The second reaction product is then reacted with an excess of an M metal salt to form a third reaction product. Next, the third reaction product is extracted with a suitable solvent to remove metal salts and any unreacted M metal salts to form a fourth reaction product. Finally, the fourth reaction product is heated to form the amorphous chemical composition having the formula $M^{n+}_{2x/n}(L_6S_8)S_x$.

A method for making a hydrodesulfurization catalyst from the compounds of this invention is also disclosed. The method comprises, first mixing $Na_{2x}(Mo_6S_8) \cdot yR$, a M metal salt, and a suitable solvent. M is selected from the group consisting of sodium, tin, cobalt, nickel, lead, lanthanum, and holmium, n is 1, 2, or 3; x is from 0.5 to 1.5, and y is 4 to 5. R is an amine or other solvent molecule such as methanol; n is 1, 2, or 3; x is from 0.5 to 1.5; and y is 4 to 5. The mixture is then reacted to produce a reaction product. Next, the reaction product is separated from the solvent, extracted, and dryed to produce $M^{n+}_{2x/n}(Mo_6S_8)S_x \cdot yR$. Preferably, the catalyst to a reducing hydrogen gas flow. The catalyst can be heated to a predetermined temperature for a predetermined time period under flowing hydrogen gas. Preferably, the catalyst is pretreated the following steps: 1) segregating 40–100 mesh particle size powders of said catalyst; 2) loading the powder into an alumina boat inside a quartz tube; 3) heating said powder to a predetermined temperature under flowing hydrogen gas for a predetermined period of time; and 4) cooling said powder under flowing hydrogen gas. Also, the catalyst can be subjected to a flow of helium gas alone or a mixture of hydrogen and helium gas flow.

BRIEF DESCRIPTION OF THE DRAWINGS

With this description of the invention, a detailed description follows with reference being made to the accompanying figures of drawings which form part of the specification and of which.

DESCRIPTION OF THE PREFERRED EMBODIMENT(S)

Figure 1:
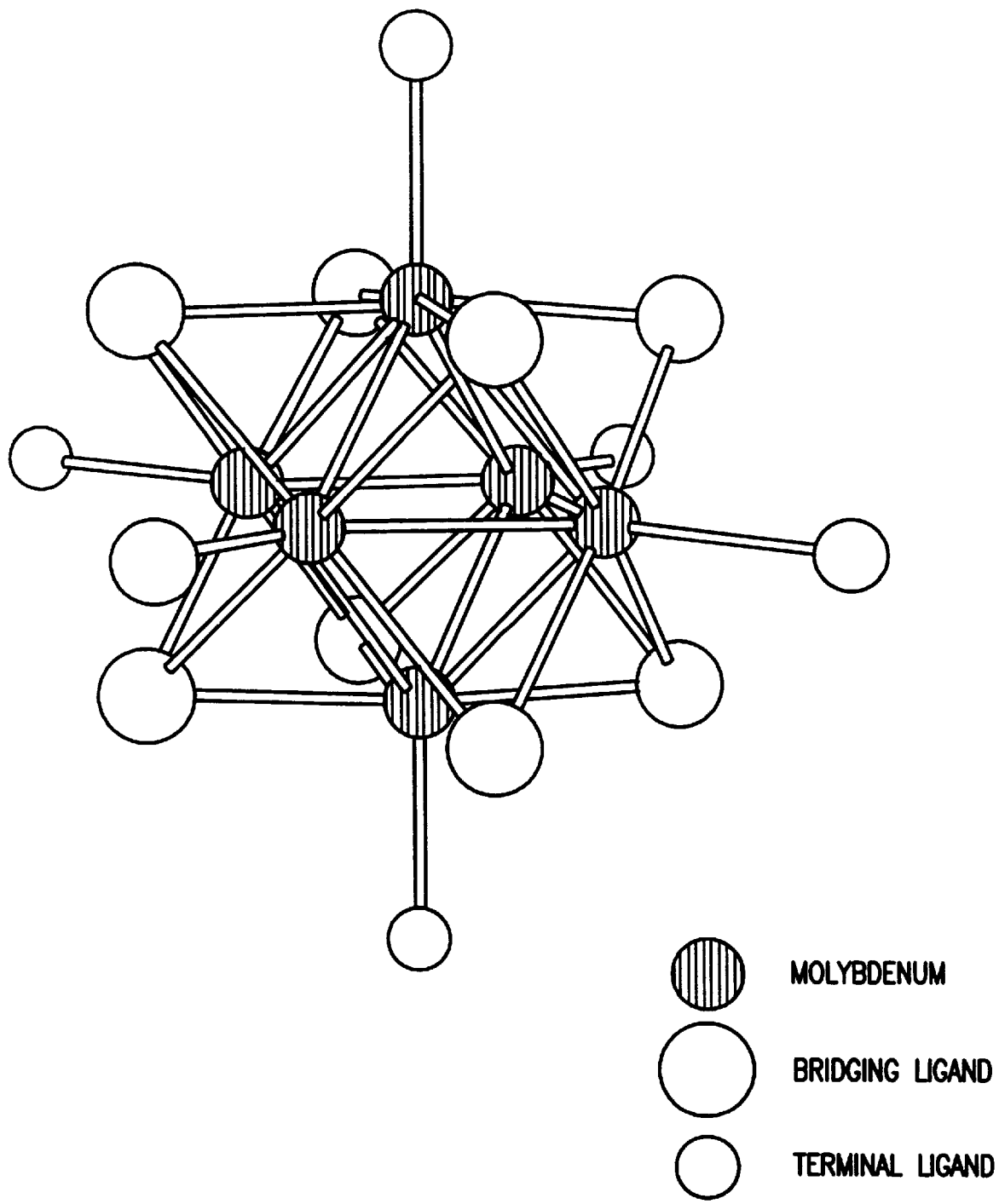
FIG. 1 is a structure of the $Mo_6Y_8$ cluster unit.

EXPERIMENTAL PROCEDURES (Mo$_6$Cl$_8$)Cl$_4$ and (W$_6$Cl$_8$)Cl$_4$ were prepared by literature methods, F. W. KOKNAT, T. J. ADAWAY, S. I. ERZERUM, AND S. SYED, *Inorg. Nucl. Chem. Lett.* 16, 307 (1980), and X. ZHANG AND R. E. McCARLEY, *Inorg. Chem.* 34, 2678 (1995), respectively). NaSH was prepared by reaction of H$_2$S with NaOEt in ethanol according to Brauer, 14 G. BRAUER, in "Handbuch der Preparativen Anorganischen Chemie," p.371, F. Enke Verlag, Stuttgart (1975). NaO-n-Bu was obtained by the reaction of sodium metal with 1-butanol and used as the solid after vacuum removal of the solvent. All solvents were purified and dried prior to use according to accepted procedures. Manipulation of all air-sensitive materials was conducted under Ar or N$_2$ atmospheres or on the vacuum manifold.

Syntheses

Preparation of Na$_{2x}$(Mo$_6$S$_8$)S$_x$(MeOH)$_y$. The following reaction is given as representative of the preparative process. Mo$_6$Cl$_{12}$ (4.00 g, 4 mmol), NaSH (2.69 g, 48 mmol), and NaOBu (2.30 g, 24 mmol) were weighed in the drybox and transferred to a Schlenk reaction flask equipped with a water-cooled condenser. By syringe, 75 mL of 1-butanol was added to the reactants. The mixture was refluxed for 2–3 days. After cooling, a black solid and faint yellow solution were separated by filtration. The solid was extracted with methanol for several days to remove the NaCl by-product, and the remaining solid was dried in vacuo. The resulting black solid (4.15 g, 93% yield) showed no evidence of Cl by chlorine analyses. The presence of sodium was confirmed by photoelectron spectroscopy (PES). Also, it was observed that the sodium and methanol contents showed some degree of variability from one reaction to another. The product was found to be insoluble and amorphous to X-rays. IR (Nujol, cm$^{-1}$): $\upsilon$(C—O)$_{MeOH}$ 969 (br), $\upsilon$(Mo—S) 381 (br). Anal. Calcd for Na$_{2.8}$(Mo$_6$S$_8$)S$_{1.4}$(MeOH)$_{4.2}$: Na, 5.98%; Mo, 53.50%. Found: Na, 5.98%; Mo, 53.43%; Na/Mo$_6$=2.80.

Preparation of Na$_{2x}$(W$_6$S$_8$)S$_8$(MeOH)$_y$. W$_6$Cl$_{12}$(2.34 g, 1.53 mmol), NaSH (1.02 g, 18.2 mmol), and NaOEt (0.625 g, 9.2 mmol) were loaded in a Schlenk reaction flask equipped with a water-cooled condenser. By distillation, 50 mL of acetonitrile was added to the reactants and the mixture was refluxed for 3–4 days. A black solid and faint yellow solution were separated by filtration. The solid was extracted with methanol for several days to remove the NaCl by-product, and the remaining solid was dried in vacuo. The product (2.06 g) showed absence of Cl by chlorine analyses. The presence of sodium was confirmed by PES. The product was found to be slightly soluble in methanol and amorphous to X-rays. IR (Nujol, cm$^{-1}$): $\upsilon$(C—O)$_{MeOH}$ 960 (br), $\upsilon$(W—S) 376. Anal. Calcd for Na$_{2.1}$(W$_6$S$_8$)S$_{1.05}$(MeOH)$_{5.4}$: Na, 2.98%; W, 68.19%. Found: Na, 3.02%; W, 66.50%; Na/W$_6$=2.12.

Preparation of M$^{n+}_{2x/n}$(Mo$_6$S$_8$)S$_x$ and Sn$_x$(W$_6$S$_8$)S$_x$ by Ion-Exchange. The general procedure for the ion-exchange reaction involved the transfer in the drybox of weighed amounts of Na$_{2x}$(Mo$_6$S$_8$)S$_x$(MeOH)$_y$ (1.00 g) and a 5–6 fold excess of the metal salt (MCl$_2$ for M=Sn, Co, Ni; MCl$_3$ for M=Ho, La; Pb(NO$_3$)$_2$) into a 100 -mL Schlenk reaction flask, and then 30 mL of methanol was vacuum-distilled onto the solids. After the mixture was stirred at room temperature for 1–2 days, a black solid and faint yellow solution were obtained. The resulting solid was extracted with solvent distilled from the filtrate in order to remove the NaCl by-product and any unreacted metal salt. After drying under dynamic vacuum, a black powder was obtained. The product was found to be insoluble and amorphous to X-rays. IR (Nujol, cm$^{-1}$): $\upsilon$(C—O)$_{MeOH}$ 980 (br), $\upsilon$(Mo—S) 383 (br). Anal. Calcd for Sn$_{1.2}$(Mo$_6$S$_8$)S$_{1.2}$(MeOH)$_{4.6}$: Sn, 12.27%; Mo, 49.61%. Found: Sn, 12.18%; Mo, 49.59%; Sn/Mo$_6$=1.19. Anal. Calcd for Co$_{0.8}$(Mo$_6$S$_8$)S$_{0.8}$(MeOH)$_{3.9}$: Co, 4.58%; Mo, 55.89%. Found: Co, 4.54%; Mo, 55.82%; Co/Mo$_6$=0.79. Anal. Calcd for Ni$_{1.0}$(Mo$_6$S$_8$)S$_{1.0}$(MeOH)$_{4.4}$: Ni, 5.52%; Mo, 54.11%. Found: Ni, 5.34%; Mo, 54.04%; Ni/Mo$_6$=0.97. Anal. Calcd for La$_{0.6}$(Mo$_6$S$_8$)S$_{0.9}$(MeOH)$_{5.4}$: La, 7.23%; Mo, 51.69%. Found: La, 7.24%; Mo, 51.66%; La/Mo$_6$=0.58. Anal. Calcd for Ho$_{0.3}$(Mo$_6$S$_8$)S$_{0.45}$(MeOH)$_{4.4}$: Ho, 4.77%; Mo, 55.52%. Found: Ho, 4.98%; Mo, 55.58%; Ho/Mo$_6$=0.31.

Sn$_x$(W$_6$S$_8$)S$_x$ was prepared in a similar manner to the molybdenum analogues, except tetrahydrofuran (THF) was used as the solvent instead of methanol. Then the product was extracted with methanol in order to remove the NaCl. The black product is amorphous to X-rays. IR (Nujol, cm$^{-1}$): $\upsilon$(C—O)$_{MeOH}$ 958 (br), $\upsilon$(W—S) 376.

Conversion to Na$_x$Mo$_6$S$_8$ and SnMo$_6$S$_8$. Na$_{2x}$(Mo$_6$S$_8$)S$_x$·yMeOH was placed in a Pyrex ampoule with joints for connection to the vacuum manifold. The ampoule was then heated in a furnace to 500° C. under a dynamic vacuum of 10$^{-4}$ torr to remove the bound methanol. In attempts to prepare the desired sodium Chevrel phase, the samples were then loaded into fused silica vessels and sealed in vacuo for annealing at 800°, 900°, and 1100° C. for 2–5 days. Examination of Na$_{2x}$(W$_6$S$_8$)S$_x$·yMeOH was also explored by heating in vacuo and in flowing H$_2$ at temperatures up to 200° C.

A different route was used to prepare the tin Chevrel phase, SnMo$_6$S$_8$. The Sn$_x$(Mo$_6$S$_8$)S$_x$·yMeOH sample was heated in flowing H$_2$ over the range 500° to 1000° C. In all cases, the sample was placed into an alumina boat inside a quartz tube. The material was then heated in a furnace to the desired temperature while under a flowing H$_2$ gas stream. Similar attempts were examined with the tungsten compound Sn$_x$(W$_6$S$_8$)S$_x$·yMeOH, by heating at 200° C. in flowing H$_2$.

Physical Methods

Infrared spectra (4000-200 cm$^{-1}$) were recorded with a Bomem MB-102 Fourier transform infrared spectrometer equipped with CsI optics. Samples were prepared as Nujol mulls and mounted between CsI windows. Raman spectra were obtained with a Spex Triplemate spectrometer with a Princeton Applied Research Corp. intensified SiPD detector cooled to −40° C. The excitation source was a Coherent Ar+200 series laser (514.5 nm) and the scattered radiation was collected in a backscattering geometry. The laser power at the sample was approximately 20 mW, and the integration time was 200 s. The Raman spectra were obtained at room temperature from solid samples packed in capillary tubes. Photoelectron (PE) spectra were collected with a Physical Electronics Industries 5500 multi-technique surface analysis system, and the binding energies were calibrated with C 1s binding energy (BE) of 284.6 eV. Powder X-ray diffraction (XRD) data were obtained with a Philips ADP3520 θ-2θdiffractometer using Cu K α radiation. The air-sensitive samples were loaded into a specially designed sample holder and sealed while in the drybox.

Molybdenum was determined gravimetrically as the 8-hydroxyquinolate nd tungsten was determined as the trioxide (W. T. ELWELL AND W. F. WOOD, in "Analytical Chemistry of Molybdenum and Tungsten," p. 41, Pergamon Press, New York, (1971). Chlorine was determined by potentiometric titration with a standardized silver nitrate solution. Sodium was determined by atomic absorption using a Perkin-Elmer 305B spectrometer. Cobalt, lanthanum, and holmium were separated prior to the molybdenum oxime analyses as insoluble oxides and fired to constant weight. Tin was separated from molybdenum and determined as the oxide (N. H. FURMAN (Ed.) in "Standard Methods of Chemical Analysis," 6th Ed., Chapt. 47, D. Van Nostrand, Princeton, N.J. (1962). Nickel was determined as the dimethylglyoxime complex (*Ibid,* Chapt. 31 ).

RESULTS AND DISCUSSION

Preparation of sodium salts $Na_{2x}(M_6S_8)S_x·yMeOH$

The most important result of this research involves the preparation of the sodium salts, $Na_{2x}(M_6S_8)S_x$, of both the molybdenum and tungsten $M_6S_8$ cluster units. Although an excess of NaSH is always used to ensure complete sulfidation of the $M_6Cl_{12}$ starting materials, higher ratios of NaSH/$Mo_6Cl_{12}$ promote greater values of x. The reactions appear to proceed by the following equation:

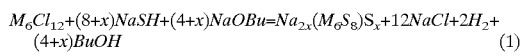

$$M_6Cl_{12}+(8+x)NaSH+(4+x)NaOBu=Na_{2x}(M_6S_8)S_x+12NaCl+2H_2+(4+x)BuOH \quad (1)$$

In all cases, the use of excess NaSH assures oxidation of the cluster units to the 20-electron neutral cluster core $(M_6S_8)^0$. Formation of these sodium salts results from coordination of sulfide ions in the terminal positions of the cluster units. Since the NaCl by-product is removed from the precipitated materials with methanol washing, some methanol is retained by coordination in the terminal positions or incorporated in the lattice. Compounds of the general formula $Na_{2x}(M_6S_8)S_x·yMeOH$ are thus obtained, with y in the range of 4 to 5. Furthermore, these materials are amorphous and generally quite reactive in air.

Close control of the value of x is difficult. For three different reactions with the same reaction ratios of 1:12:6 ($Mo_6Cl_{12}$:NaSH:NaOBu), the observed values of x were 0.85, 1.2 and 1.4. For the reaction ratios 1:11:7,x=1.15 and for the ratios 1:15:7,x=1.5. Thus, for the compositions $Na_2(Mo_6S_8)S$ and $Na_3(Mo_6S_8)S_{1.5}$, desired in the subsequent ion-exchange with $M^{2+}$ and $M^{3+}$ cations, the reaction ratios of 1:11:7 and 1:15:7, respectively, are the most suitable. Less information about the control of x is available at the present time for the tungsten materials.

The best results for the preparation of the molybdenum salts has been found with use of butanol as a solvent. However in the preparation of the analogous tungsten compounds, butanol was found to cause slight decomposition as evidenced by the presence of bands at 450 and 500 cm$^{-1}$ in the IR spectra. This decomposition is minimized when the reactions are conducted in acetonitrile. Fortunately, the sulfidation of $W_6Cl_{12}$ is more facile than that of $Mo_6Cl_{12}$, which makes the lower temperature of refluxing acetonitrile (82° C.) advantageous.

Figure 2:
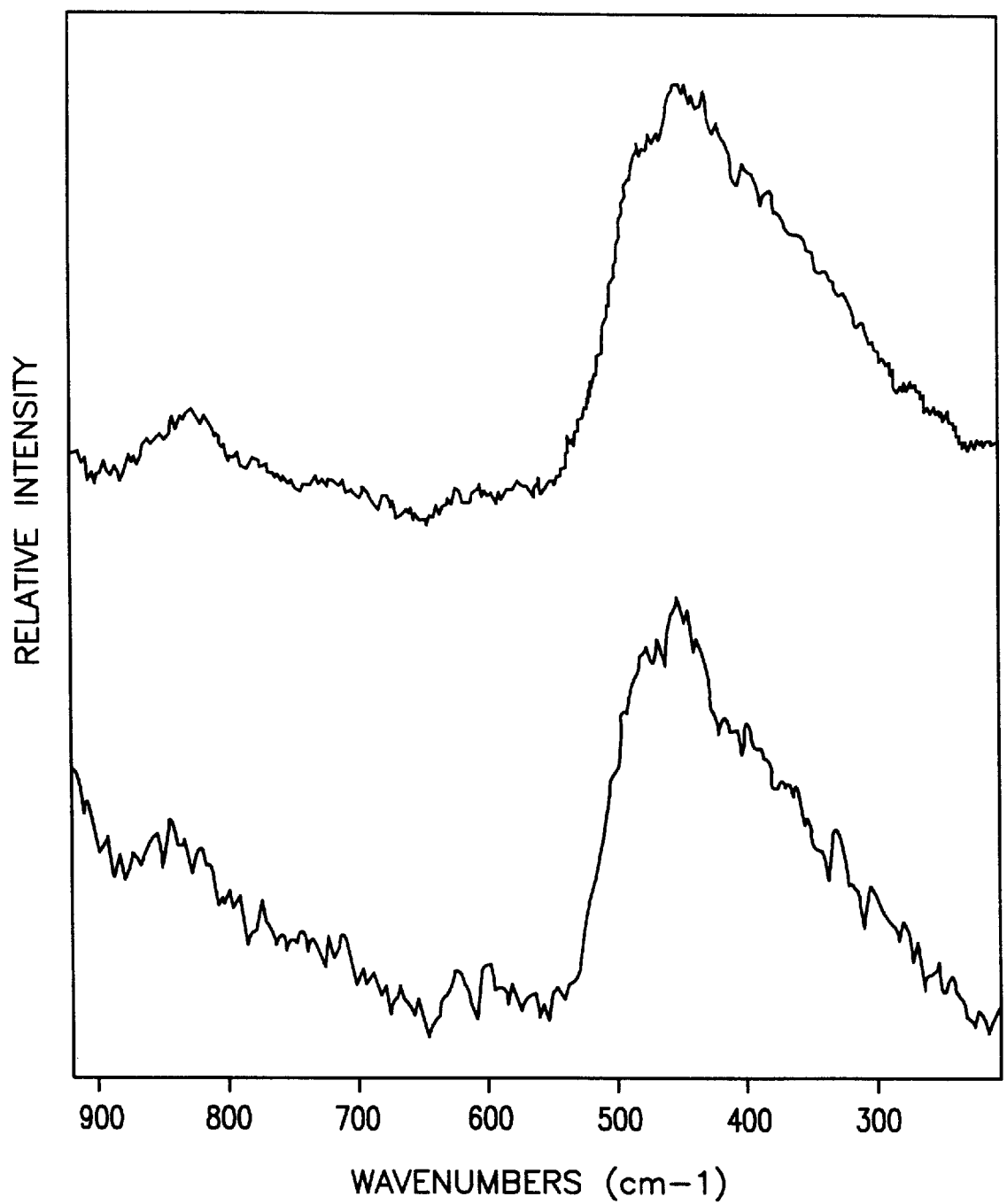
FIG. 2 is a Raman spectra of amorphous materials, $(Mo_6S_8)(PrNH_2)_{6-x}$ (top) and $Na_2(Mo_6S_8)S \cdot yMeOH$ (bottom)

IR spectra for the sodium salts show strong bands at 381 and 376 cm$^{-1}$, characteristic of the M—S stretching mode of $T_{1u}$ symmetry for the $Mo_6S_8$ and $W_6S_8$ cluster units, respectively. Raman spectra of the amorphous $Na_{2x}(M_6S_8)S_x·yMeOH$ also shows a broad emission centered at 450 cm$^{-1}$ arising from the Mo—S stretching modes. The sharp Raman mode of $A_{1g}$ symmetry at 415±3 cm$^{-1}$, characteristic of crystalline $(Mo_6S_8)L_6$ derivatives, cannot be seen in the spectra of amorphous materials. A comparison of the broad bands in the Raman spectra of the amorphous $Na_{2x}(Mo_6S_8)S_x·yMeOH$ and the partially deligated $(Mo_6S_8)(PrNH_2)_{6-x}$ (S. J. HILSENBECK, R. E. McCARLEY, AND A. I. GOLDMAN, *Chem. Materials* 7, 499 (1995))is shown in FIG. 2.

Figure 3:
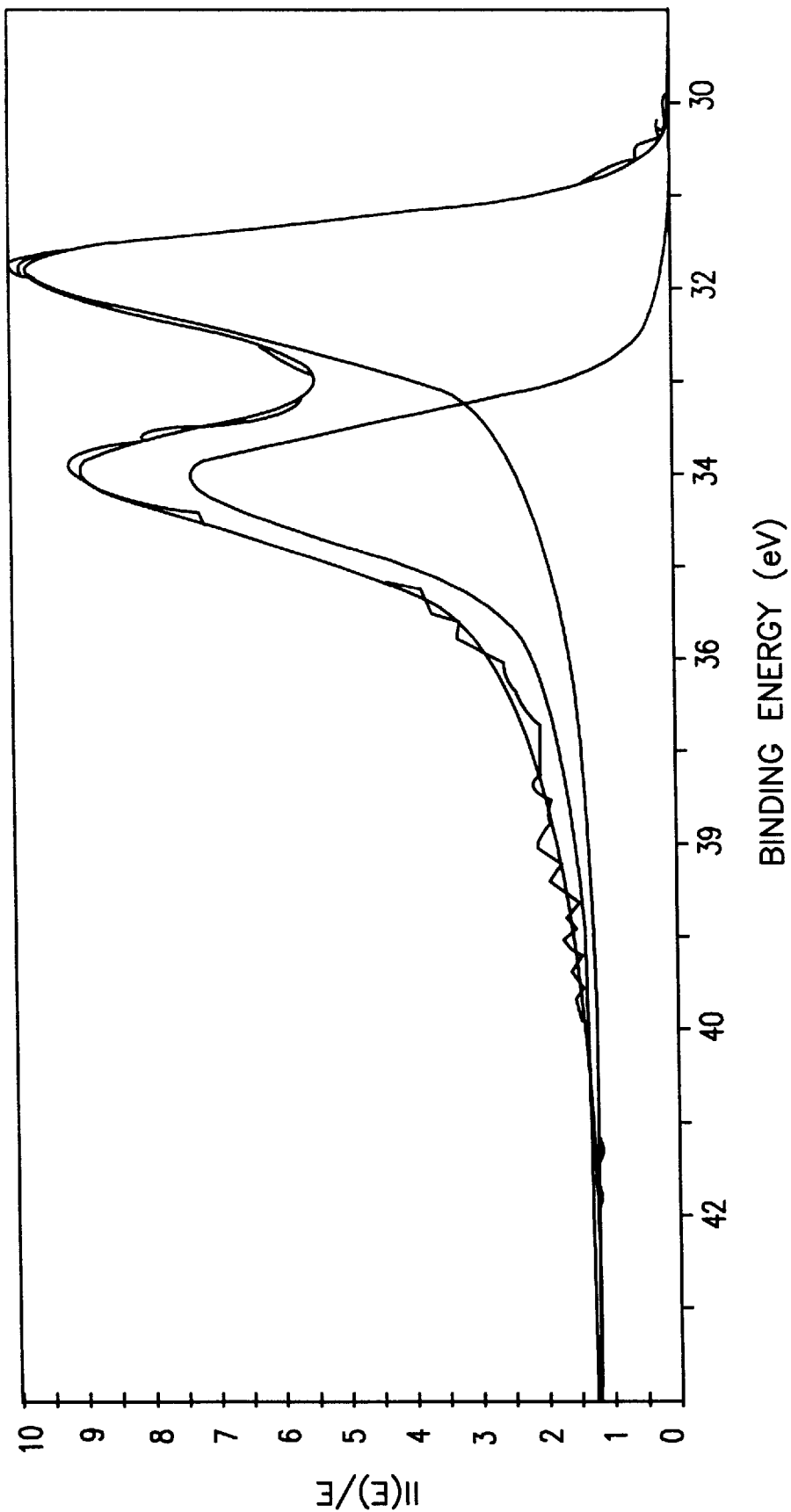
FIG. 3. is a W 4 f photoelectron spectrum of $Na_{2.1}(W_6S_8) S_{1.05}(MeOH)_{5.4}$.

Perhaps the most useful spectroscopic data are provided by Mo 3d and W 4f photoelectron spectra. The W 4f PES of $Na_{2.1}(W_6S_8)S_{1.05}·(MeOH)_{5.4}$ is shown in FIG. 3, which illustrates that only one type of tungsten atom is necessary to fit this spectrum. The derived binding energies of 30.8 $(4f_{7/2})$ and 33.0 eV $(4f_{5/2})$ are characteristic of the $W_6S_8$ unit and compare with the $4f_{7/2}$ BE's of 31.2 eV for $(W_6S_8)$ $(PEt_3)_6$ (T. SAITO, A. YOSHIKAWA, T. YAMAGATA, H. IMOTO, AND K. UNOURA, *Inorg. Chem.,* 28, 3588 (1989).), 32.7 eV for $WS_2$, and 35.4 eV for $WO_3$. PES data for the molybdenum compounds, including $Na_{2x}(M_6S_8)S_x·yMeOH$, are given in Table I. The Mo $3d_{5/2}$ BE of 227.2 eV for the latter is in agreement with the BE's of 227.5±0.4 eV observed for the materials prepared from this sodium salt by ion-exchange. For comparison, the Mo $3d_{5/2}$ of $MoS_2$ is 229.5 eV. This 2.0 eV difference in BE makes $MoS_2$ easily detectable when it occurs as an impurity. None of the compounds listed in Table I showed evidence for the presence of $MoS_2$.

Ternary salts prepared by ion-exchange

The preparation of the ternary compounds $M^{n+}_{2x/n}$ $(Mo_6S_8)S_x$ and $Sn_x(W_6S_8)S_x$ by ion-exchange from the sodium salts could be accomplished by stirring the latter with appropriate salts of the desired cations in methanol for the molybdenum compounds and THF for the tungsten compound. Slow decomposition of the tungsten cluster is again observed in methanol, which makes the use of THF as an alternate solvent desirable. Complete exchange after about 1 day of stirring the reaction mixture was verified by PES analysis, which showed the absence of Na in any of the products. Even though reactions were started with materials of composition near $Na_2(M_6S_8)S·yMeOH$, only the compounds $Sn_{1.2}(Mo_6S_8)S_{1.2}(MeOH)_{4.6}$ and $Ni_{1.0}(Mo_6S_8)S_1$ $(MeOH)_{4.4}$ could be verified as having the expected composition for replacement of all $Na^+$ by $Sn^{2+}$ or $Ni^{2+}$. In the other cases, loss of coordinated sulfide evidently also occurred during the ion-exchange process and the products thus achieved a lower $M^{n+}$/cluster ratio than indicated by the initial Na stoichiometry. This was especially noticeable with the holmium salt, which only resulted in 46 percent of the expected $Ho^{3+}$ content. In all cases, the ion-exchanged materials retained from 4 to 5 methanol molecules per cluster unit. The exact composition of the $Sn_x(W_6S_8)S_x$ compound is unknown except that the PES analysis verified the absence of Na and the presence of Sn. By analogy to the results for the molybdenum compound, complete exchange of Sn for Na would provide a material of composition $Sn_{1.05}(W_6S_8)S_{1.05} \cdot yMeOH$.

Bands at 376 and 381 $cm^{-1}$ in the IR spectra of the $Sn_x(M_6S_8)S_x \cdot yMeOH$ materials reflect the presence of the $W_6S_8$ and $Mo_6S_8$ cluster units, respectively. Likewise, the constant Mo 3d, S 2s, and S 2p BE's derived from the PE spectra of the ternary molybdenum compounds, given in Table I, show the unchanging presence of the $(Mo_6S_8)^0$ cluster unit. Similarly, the W $4f_{7/2}$ BE of 30.9 eV for $Sn_x(W_6S_8)S_x \cdot yMeOH$ agrees with the values given above for $Na_{2x}(W_6S_8)S_x \cdot yMeOH$ and $(W_6S_8)(PEt_3)_6$.

Conversion to crystalline $NaMo_6S_8$

Figure 4:
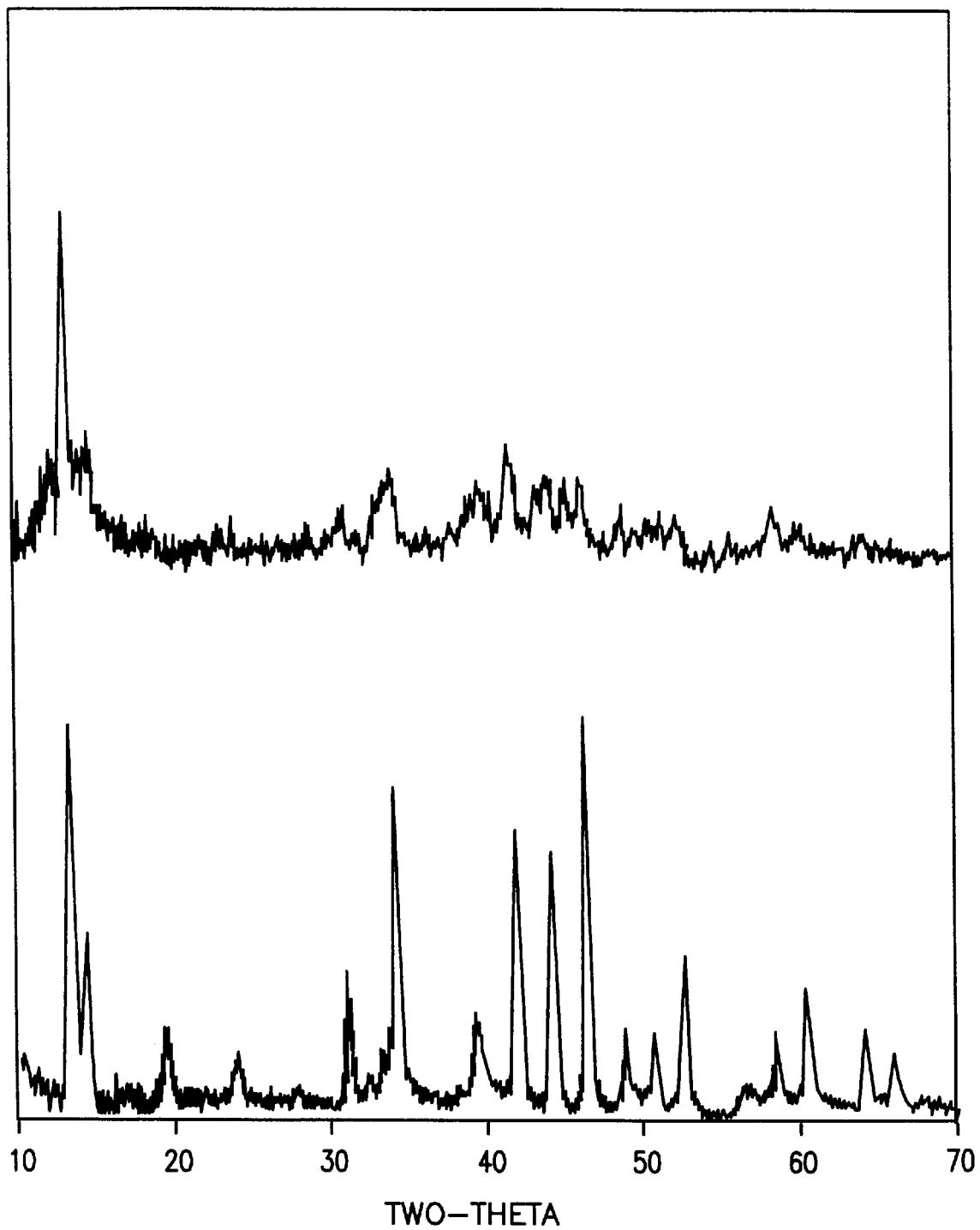
FIG. 4a shows X-ray powder diffraction patterns for $NaMo_6S_8$ prepared from $Na_2(Mo_6S_8)S \cdot yMeOH$ after annealing at 800° C. (top) and 900° C. (bottom), respectively.

After removal of bound methanol from $Na_{2x}(Mo_6S_8)S_x \cdot yMeOH$ in vacuo at 500° C., further annealing at higher temperatures ultimately leads to formation of the polycrystalline $NaMo_6S_8$ Chevrel phase. Annealing at 800° C. results in the broad XRD lines shown in FIG. 4a. Annealing at lower temperatures fails to provide crystalline material, while annealing at 900° C. results in markedly improved crystallinity as observed in FIG. 4b. In these materials, the strongest line of $MoS_2$ at $2\theta=14.5°$ appears in all samples annealed below 1100° C. This $MoS_2$ line did not appear in a sample annealed at 1100° C. Notably, no lines of $Na_2S$ or $Mo_2S_3$ could be detected in these XRD patterns. On the basis of the approximate starting composition $Na_2Mo_6S_9$, we expect a disproportionation to occur, as given in eqn. 2.

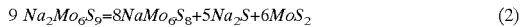

$$9\,Na_2Mo_6S_9 = 8NaMo_6S_8 + 5Na_2S + 6MoS_2 \qquad (2)$$

Thus poorly crystalline $MoS_2$ should be seen as a product of the annealing. However, the $Na_2S$ formed in this reaction probably reacts with the fused silica vessel and is removed from the mixture. The reason for the disappearance of the strongest line of $MoS_2$ in the sample annealed at 1100° C. is not apparent.

The lattice parameters calculated from the XRD data of the sample annealed at 900° C., $a_H=9.202(3)$ and $c_H=11.227(6)$ Å, are in reasonably good agreement with the values given by Gocke et al. (E. GOCKE, W. SCHRAMM, P. DOLSCHEID, AND R. SCHÖLLHORN, *J. Solid State Chem.*, 70, 71 (1987). for $Na_1Mo_6S_8$, $a_H=9.231$ and $c_H=11.321$ Å. For comparison, the lattice parameters for $Mo_6S_8$ were reported as $a_H=9.192$, $c_H=10.889$ Å, and for $Na_3Mo_6S_8$ as $a_H=9.897$, $c_H=10.725$ Å. On the basis of these lattice parameters, we formulate the product as $NaMo_6S_8$ in eqn. 2. The conversion of the $Na_{2x}(Mo_6S_8)S_x$ precursor to crystalline $NaMo_6S_8$ at 800° C. is noteworthy, since much higher temperatures are generally needed for direct synthesis of the Chevrel phase compounds.

Conversion to crystalline $SnMo_6S_8$

Figure 5:
FIG. 5a shows X-ray powder diffraction patterns for SnMo$_6$S$_8$ prepared from Sn(Mo$_6$S$_8$)S·yMeOH by hydrogen reduction at 600° C. (top), 700° C. (middle), and 1000° C. (bottom). Reflections marked with M and S indicate those arising from Mo and Sn metals, respectively.

In order to obtain the $SnMo_6S_8$ Chevrel phase from the ion-exchanged precursor, $Sn_{1.2}(Mo_6S_8)S_{1.2}(MeOH)_{4.6}$, conversion in flowing $H_2$ was utilized. At lower temperatures, $\leq 500°$ C., the bound methanol was lost. Reduction and conversion of the amorphous precursor were examined at successively higher temperatures from 500° to 1000° C. Formation of poorly crystalline $SnMo_6S_8$ was first observed after 6 h at 600° C., as indicated by the broad lines in FIG. 5a. After 6 h at 700° C., the XRD lines were sharp and exhibited about the same bandwidth as those from conversion at 1000° C. (FIGS. 5b,c). In all cases, the appearance of the two strongest lines of Mo indicated that reduction of $SnMo_6S_8$ was occurring simultaneously with its formation. Production of Mo should be accompanied by formation of Sn, but the latter was only observed in the XRD for the sample reduced at 700° C.

The lattice parameters calculated from the XRD data of the sample heated at 700° C. under flowing $H_2$, $a_H=9.188(3)$ and $c_H=11.366(6)$ Å, are again in reasonable agreement with the values given by Chevrel et al. (R. CHEVREL, C. ROSSEL, AND M. SERGENT, *J. Less Common Met.*, 72, 31 (1980). for the single crystal determination of $SnMo_6S_8$, $a_H=9.206$ and $c_H=11.363$ Å. Thus we find that the $SnMo_6S_8$ Chevrel phase can be produced from the precursor at temperatures as low as 600° C., but in flowing $H_2$ its formation is always accompanied by reduction to Mo metal. To avoid the latter reduction, an appropriate partial pressure of $H_2S$ should be included in the gas flow.

Attempted conversion to crystalline $M_xW_6S_8$

Upon heating $Na_{2.1}(W_6S_8)S_{1.05}(MeOH)_{5.4}$ at 130° C. in vacuo for 3 days, the sample suffered only partial loss of bound methanol, but both the IR and PE spectra showed that the $W_6S_8$ cluster unit survived. However, heating a separate sample at 300° C. for 1 d resulted in decomposition and formation of W and $WS_2$ according to both PES and IR data. Heating at 200° C. under flowing $H_2$ also resulted in formation of W and $WS_2$. Thus formation of the metastable crystalline $Na_xW_6S_8$ must be affected at a temperature less than 200° C. if it is to succeed. Efforts to convert $Sn_x(W_6S_8)S_x \cdot yMeOH$ to the Chevrel phase analogue also failed, with decomposition resulting from reaction under $H_2$ at 200° C.

TABLE 1

Binding Energies (eV) from Photoelectron Spectra of Ternary Sulfides $M_{2x/n}{}^+(Mo_6S_8)S_x \cdot {}^a$

| Compound[b] | Mo $3d_{5/2}$ | Mo $3d_{3/2}$ | S 2s | S $2p_{3/2}$ | S $2p_{1/2}$ | M[c] |
|---|---|---|---|---|---|---|
| NaMoS | 227.2 | 230.4 | 225.0 | 160.6 | 161.8 sh | — |
| CoMoS | 227.9 | 231.1 | 225.8 | 161.3 | 162.5 sh | 779.0 |
| NiMoS | 227.7 | 230.8 | 225.6 | 161.0 | 162.2 sh | 852.8 |
| SnMoS | 227.5 | 230.6 | 225.4 | 161.8 br | — | 487.0 |
| PbMoS | 227.7 | 230.8 | 225.4 | 161.6 br | — | 137.4 |
| LaMoS | 227.7 | 230.9 | 225.9 | 161.6 br | — | 838.0 |
| HoMoS | 227.2 | 230.5 | 225.0 | 161.1 br | — | — |

[a]Values adjusted to C 1s binding energy of 284.6 eV; br = broad, sh = shoulder.
[b]For actual compositions see experimental section.
[c]M = Co or Ni, $2p_{3/2}$; M = Sn or La, $3d_{5/2}$; M = Pb, $4f_{7/2}$.

Experimental Method for Catalyst

Catalyst synthesis

The method used for preparing the MMoS samples involved the room temperature ion-exchange reaction of $MCl_2$ (M=Sn, Co, Ni) with $Na_{2x}Mo_6S_{8+x}(MeOH)_y$ (NaMoS) in methanol. A typical preparation is given as follows: $Na_{2x}Mo_6S_{8+x}(MeOH)_y$ (1.00 g) and a 5–6 fold excess of the metal dichloride were weighed in the drybox and transferred into a 100 -mL Schlenk reaction flask, and 30 mL of methanol (MeOH) was vacuum-distilled onto the solids. After the mixture was stirred at room temperature for 1–2 days, a blackish solid and light yellow solution were obtained. The resulting solid was extracted with solvent distilled from the filtrate in order to remove the NaCl by-product and any unreacted $MCl_2$. After drying under dynamic vacuum, a black powder was obtained (1.20 g). The product was found to be insoluble in non-coordinating solvents and amorphous to X-rays. IR (Nujol, $cm^{-1}$): $\upsilon$(C—O)$_{MeOH}$ 980 (br), $\upsilon$(Mo—S) 383 (br). Anal. Calcd for $Sn_{1.2}Mo_6S_{9.2}(MeOH)_{4.6}$: Sn, 12.27%; Mo, 49.61%. Found: Sn, 12.18%; Mo, 49.59%; Sn/$Mo_6$=1.19. Anal. Calcd for $Co_{0.8}Mo_6S_{8.8}(MeOH)_{3.9}$: Co, 4.58%; Mo, 55.89%. Found: Co, 4.54%; Mo, 55.82%; Co/$Mo_6$=0.79. Anal. Calcd for $Ni_{1.0}Mo_6S_{9.0}(MeOH)_{4.4}$: Ni, 5.52%; Mo, 54.11%. Found: Ni, 5.34%; Mo, 54.04%; Ni/$Mo_6$=0.97.

Catalyst pretreatment

SnMoS was examined as-prepared and under a variety of pretreatment conditions. Powders of 40–100 mesh particle size were separated and used for all surface area and activity measurements. Hydrogen pretreatment involved loading the SnMoS powder into an alumina boat inside a quartz tube. The sample was then heated to the desired temperature (400° or 500° C.) under flowing hydrogen gas. After cooling under a $H_2$ flow, the products were stored in an inert-atmosphere drybox prior to further study. SnMoS was also pretreated with hydrogen and helium in the reactor prior to HDS activity studies. Likewise, the CoMoS and NiMoS samples were heated at 400° C. for 6 hours under flowing hydrogen gas.

Sample characterization

The identity of these amorphous products were verified by infrared, Raman, and XP spectroscopy. Infrared spectra (4000-200 $cm^{-1}$) were recorded with a Bomem MB-102 Fourier transform infrared spectrometer equipped with CsI optics. Samples were prepared as Nujol mulls and mounted between CsI windows. Laser Raman spectra were obtained with a Spex Triplemate monochromator. The excitation source was the 514.5 -nm line of an argon laser operated at approximately 20 mW, and the integration time was 200 s. The Raman spectra were obtained in the back-scattering geometry from solid samples packed in capillary tubes. XP spectra were collected with a Physical Electronics Industries 5500 multitechnique surface analysis system, and the binding energies were calibrated with C 1s=284.6 eV. Elemental analyses for Mo, Sn, Co, and Ni were determined by standard gravimetric methods, (W. T. Elwell and D. F. Wood, *Analytical Chemistry of Molybdenum and Tungsten,* Pergamon Press, New York, 1971, pp. 41–42.; N. H. Furman (ed.) *Standard Methods of Chemical Analysis,* 6th Ed., D. Van Nostrand, Princeton, N.J., 1962, Chapt. 47; Cobalt was separated prior to the molybdenum oxime analysis as an insoluble oxide and fired to constant weight. *Ibid,* Chapt. 16; and C. L. Lewis and W. L. Ott, *Analytical Chemistry of Nickel,* Pergamon Press, New York, 1970, Chapt. 6. ), respectively.

The surface areas of the catalysts were determined by the standard BET method with a Micromeritics 2100E Accusorb instrument. Either nitrogen or krypton gas was used as an adsorbate depending upon the surface area regime.

HDS activity measurements

Hydrodesulfurization activity measurements were performed in a ¼-in. diameter stainless-steel reactor fitted with Nupro valves to allow for catalyst loading in an inert atmosphere drybox. Product separation and analysis were performed on an n-octane/Porasil C column and an Antek 310 gas chromatograph with flame ionization detector. Peak areas were measured by a Hewlett-Packard 3390A integrator.

High-purity helium (99.997%) and hydrogen (99.997%) were further purified by passage through copper traps for $O_2$ removal and 4 Å molecular sieves for drying. Thiophene (99%, Alfa) was dried prior to use.

HDS activities were measured at atmospheric pressure using thiophene as a model organo-sulfur compound. The reactor was heated from room temperature to 400° C. in a helium flow at 19 mL/min (STP). The helium flow was then replaced by a continuous flow of 2 mol% thiophene in hydrogen at 22 mL/min (STP). GC traces were obtained after 20 minutes and at one hour intervals throughout the 10 h HDS study. The reactor was then purged and cooled in a helium stream.

Results and Discussion

Preparation and Pretreatment

The impetus for this research has been on the preparation and stabilization of higher surface area HDS catalysts. The solution route used to prepare these new ternary molybdenum sulfides results in the production of materials with much higher surface areas (up to 100 $m^2/g$) than found for the Chevrel phases (up to 1 $m^2/g$). Yet, during HDS reactor studies, the as-prepared SnMoS (Table 3) and NiMoS (Table 3) materials show instability to oxidation and formation of $MoS_2$. Therefore, pretreatment studies were undertaken in order to stabilize the lower Mo oxidation states, while retaining the higher surface areas. Pretreatment was examined under an inert helium flow, a reducing hydrogen atmosphere, and one combination of these conditions. Characterization of the materials after hydrogen pretreatment indicated $Mo_6S_8$ cluster retention. However, differing degrees of stability were found after the HDS reactor studies as indicated in Table 3.

Characterization

Figure 6A:
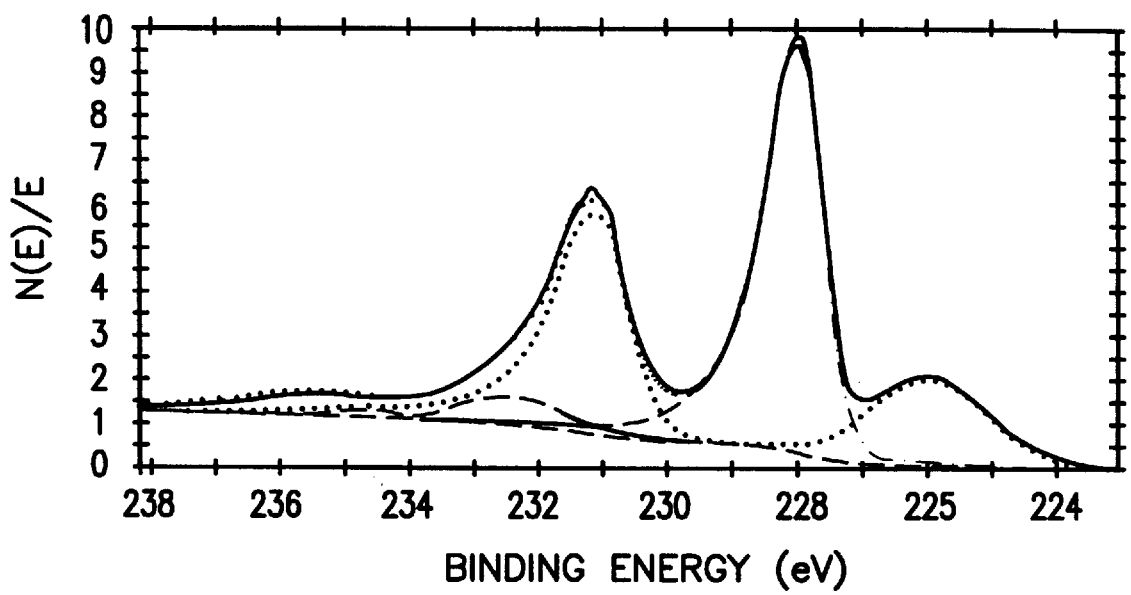
FIGS. 6a and 6b show molybdenum 3 d XPS spectra for HDS catalysts (10 h thiophene reaction) of SnMoS pretreated for 3 h at 400° C. (a) and for 20 h at 400° C. (b). The broad band centered at 226 eV arises from S 2s. Only Mo 3 d binding energies consistent with the Mo$_6$S$_8$ cluster unit are observed for (a), while peaks for both Mo$_6$S$_8$ and MoS$_2$ are noted in (b).
Figure 6B:
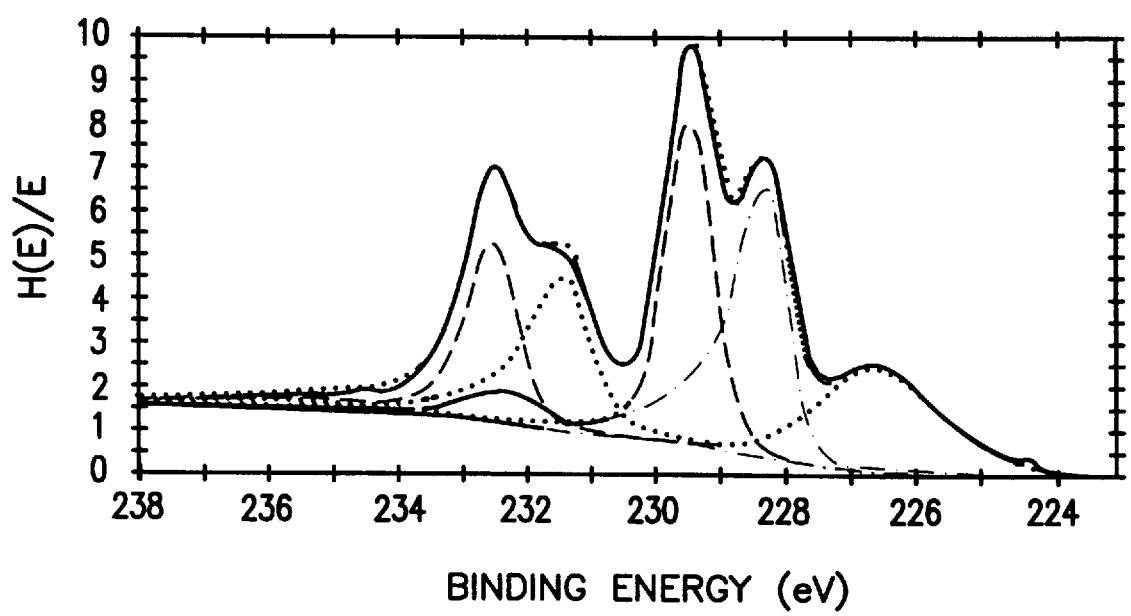

The infrared spectra for the MMoS compounds only exhibited bands for coordinated alcohol at 980 $cm^{-1}$ (br) and the symmetric Mo—S stretch characteristic of the $Mo_6S_8$ cluster unit at about 383 $cm^{-1}$. After pretreatment, this characteristic Mo—S stretch became too diffuse to be identified. Therefore, the techniques of XPS and Raman were utilized to verify $Mo_6S_8$ cluster stability or its disproportionation to $MoS_2$ and Mo metal. XPS is a sensitive tool for oxidation state changes in molybdenum sulfides since an approximate 1.5 eV shift is observed for Mo $3d_{5/2}$ binding energies between +2 to +2.67 and +4. The lower oxidation states for ternary molybdenum sulfides exhibit binding energies over the range 227.2–227.9 eV and the Chevrel phases from 227.3–228.2 eV (S. Yashonath; M. S. Hegde; P. R. Sarode; C. N. R. Rao; A. M. Umarji; G. V. Subba Rao, *Solid State Commun.,* 37 (1981) 325.), while $MoS_2$ is found at 229.5 eV ( C. Stevens; T. Edmonds, *J. Catal.,* 37 (1975) 544.). Likewise, mixtures of either reduced phase and $MoS_2$ can be easily differentiated and fit as shown in FIG. 6.

Figure 7:
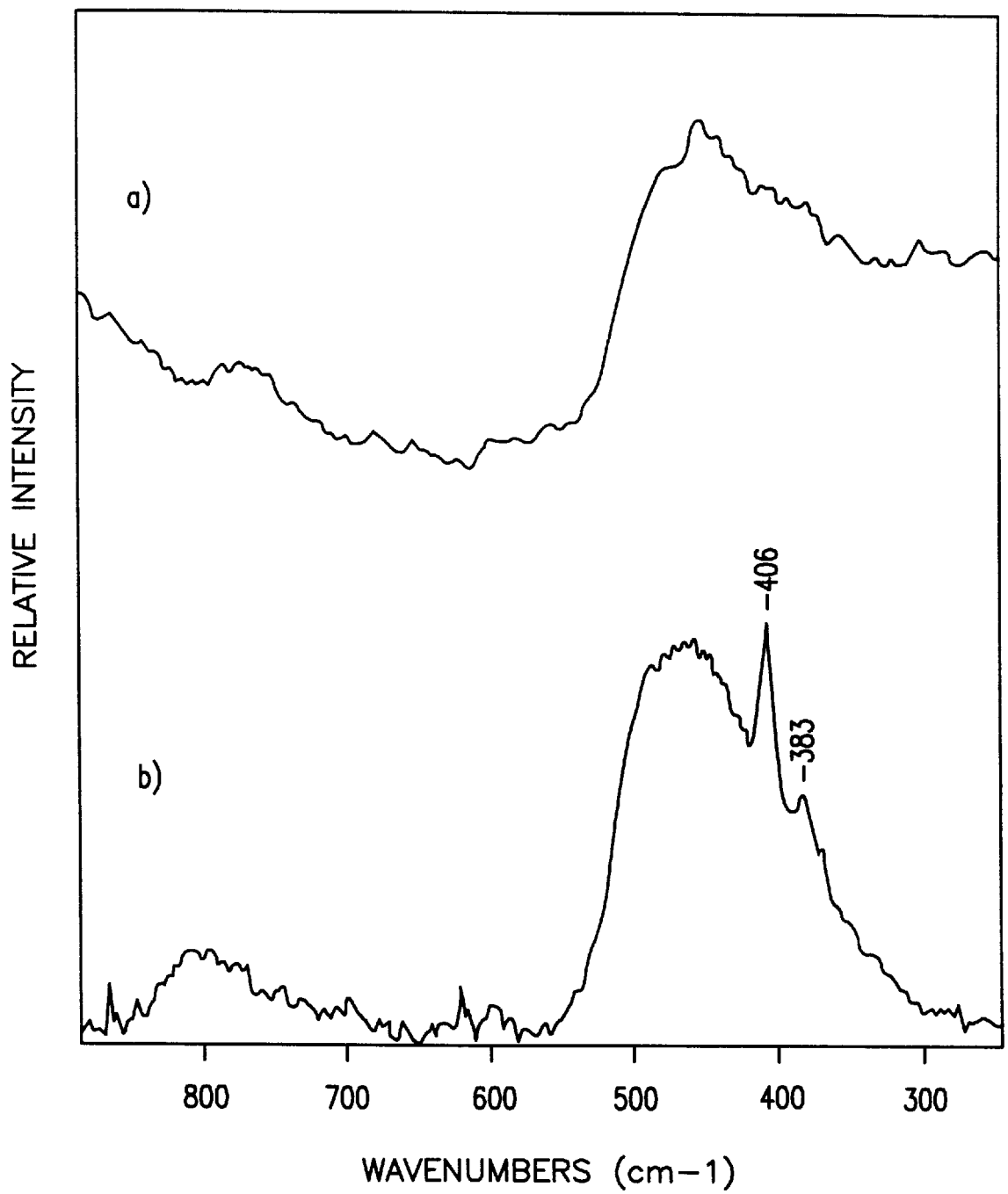
FIG. 7 is a Raman spectra for HDS catalysts (10 h thiophene reaction) of SnMoS pretreated for 3 h at 400° C. (a) and for 20 h at 400° C. (b). Only a broad band centered at 450 cm$^{-1}$ indicative of Mo$_6$S$_8$ is observed for (a), while peaks for MoS$_2$ are also detected in (b).

Raman spectroscopy further supports retention or decomposition of the cluster $Mo_6S_8$ units. As observed in FIG. 7, amorphous SnMoS exhibits only a very weak, broad band centered about 450 $cm^{-1}$, as compared to the addition of distinct $MoS_2$ peaks at 406 and 382 $cm^{-1}$ upon partial decomposition. Previous studies by the Raman technique support the identification of this broad 450 $cm^{-1}$ band as arising from the $Mo_6S_8$ cluster unit (S. J. Hilsenbeck; V. G. Young, Jr. R. E. McLarley, Inorg, Chem., 33 (1994) 1822, and S. J. Hilsenbeck; R. E. McCarley; A/I. Goldman, Chem Mater., 7 (1995) 499), respectively.

HDS activity measurements

The continuous-flow HDS reactor results for SnMoS, as-prepared and after various modes of pretreatment, are summarized in Table 2. The thiophene conversion rates are normalized on the basis of catalyst surface area. For comparison, the activity of the $SnMo_6S_8$ Chevrel phase is included. The HDS data for amorphous SnMoS indicates an active catalyst, however, the as-prepared material is unstable with respect to significant disproportionation and formation of $MoS_2$ and Mo. The final HDS rate is consistent with values previously observed for $MoS_2$. Likewise, pretreatment in a reactor at 400° C. under helium or mixed hydrogen/helium (1:1) flow also led to catalyst decomposition and formation of $MoS_2$.

Figure 8:
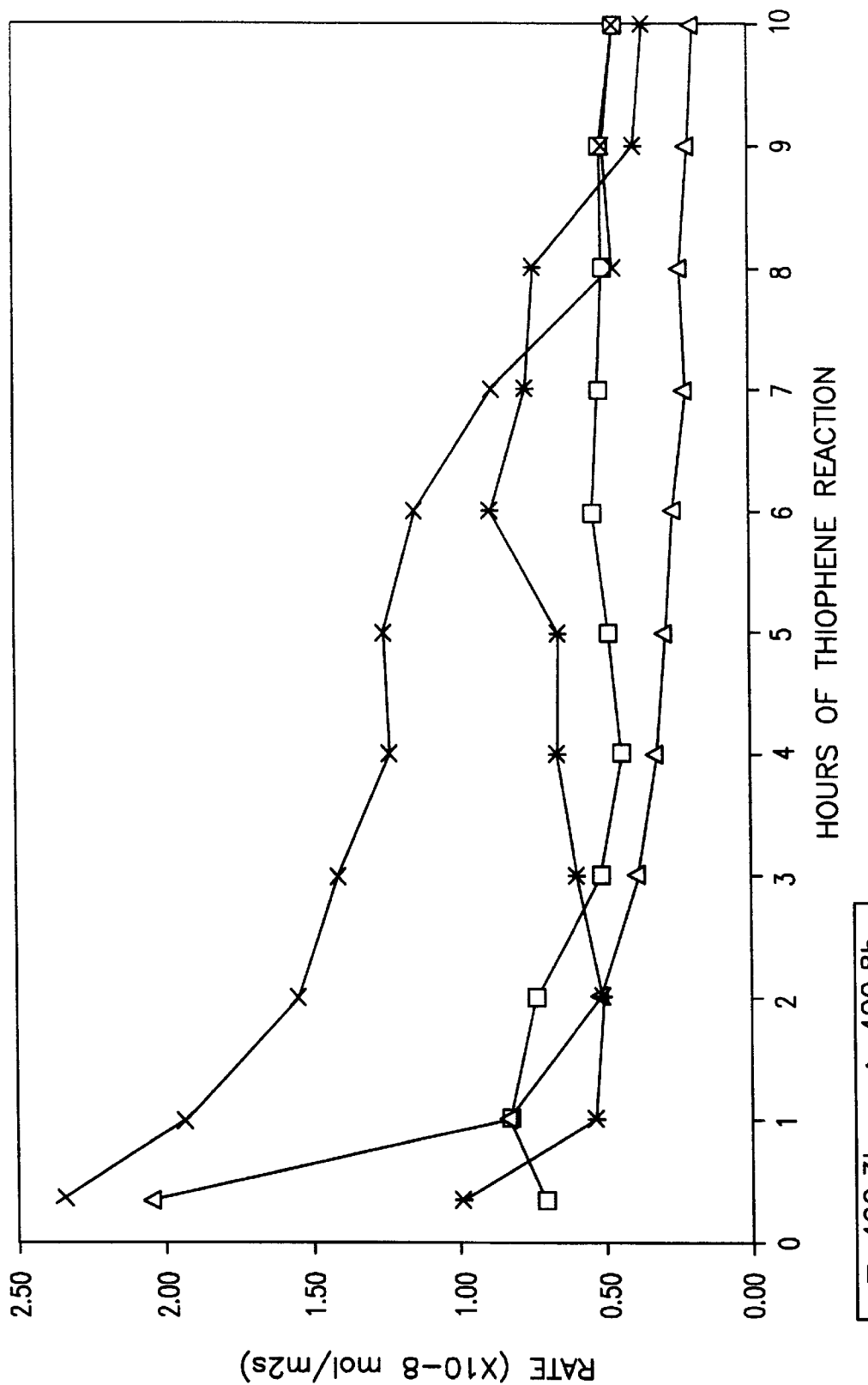
FIG. 8. is the rate of thiophene HDS reaction for SnMoS under various pretreatment conditions.

The results from Table 2 indicate the necessity of pretreatment under a reducing hydrogen atmosphere. As noted, three hydrogen pretreatment routes were found which stabilized the $Mo_6S_8$ unit—heating at 400° C. in the reactor under a pure hydrogen flow, shorter time (3 h) heating at 400° C., or heating at a higher temperature of 500° C. However, some decomposition (20%) was detected by XPS for the 500° C. sample. Longer heating at 400° C. led to material instability and pronounced decomposition. Furthermore, longer pretreatment and higher temperatures produced more sintering of the samples and thus lower surface areas. Variation of pretreatment temperatures or times seemed to have little effect on the observed activities for any of these samples studied (FIG. 8). In all cases, the HDS rates after the 10 h thiophene reaction are less than the values observed initially.

While the observed rates for the HDS stable SnMoS materials were lower than the tin Chevrel phase, the resulting surface areas were at least an order of magnitude higher (4–14 $m^2/g$). Thus, HDS stable and active "Chevrel phase-like" tin molybdenum sulfide materials have been prepared.

Comparisons with other MMoS catalysts

Previous studies on the Chevrel phases found that the small cation materials (Co, Ni, Fe, Cu) were less active and less stable than the larger ternary metal phases (Sn, Pb, Ho). This observation differed from the conventional HDS catalysts where Co and Ni are the most commonly used promoters. Therefore, the small cation Co and Ni ternary molybdenum sulfides were prepared and examined under similar pretreatment conditions to a stable tin phase.

Table 3 summarizes the results of this HDS study and compares the pretreated samples to the Chevrel phases and $MoS_2$ phases (with and without Co as a promotor). These results indicate that the small cation MMoS materials behave more like the metal-promoted $MoS_2$ phases than the Chevrel phases. The NiMoS and pretreated MMoS (M=Co, Ni) samples exhibited higher rates (2–3 x values for $Co_{0.25}$—$Mo_1$—S), while retaining a similar higher surface area. Furthermore, XPS characterization of these pretreated MMoS samples indicated a higher oxidation state for Mo ($MoS_2$), thus making the materials similar to the metal-promoted $MoS_2$ phases.

Conclusions

This paper describes the examination of new ternary molybdenum sulfides for their HDS catalytic properties. Specifically, the ternary tin molybdenum sulfide (SnMoS) has been studied under a variety of pretreatment conditions. The HDS studies indicate that the as-prepared SnMoS and its resulting pretreatment products possess reasonable HDS activities, however, specific pretreatment conditions are necessary to prevent formation of $MoS_2$, which is also a good HDS catalyst.

Pretreatment with a reducing hydrogen gas flow under three separate conditions was found to stabilize the $Mo_6S_8$ cluster units in SnMoS and prevent disproportionation to $MoS_2$ and Mo. The favorable conditions are heating at 400° C. in the reactor under flowing hydrogen gas, shorter time (3 h) $H_2$ pretreatment at 400° C., or $H_2$ pretreatment at a higher temperature of 500° C. for a period of 24 hours. This study proves that stable and active tin molybdenum sulfide materials can be prepared which possess HDS properties similar to the active tin Chevrel phases and to the industrially used cobalt-promoted $MoS_2$. Furthermore, the SnMoS materials retain the lower Mo oxidation states (like $SnMo_6S_8$), while exhibiting surface areas at least an order of magnitude higher than for the tin Chevrel phase.

Also, it was found that the small cation Co and Ni ternary molybdenum sulfide phases, pretreated in a similar manner, exhibit HDS rates which are much higher than observed for the commonly used metal-promoted $MoS_2$ phases. While these CoMoS and NiMoS materials are unstable with respect to significant disproportionation and formation of $MoS_2$, they show rate improvements as compared to the commonly used catalysts.

TABLE 2

Summary of HDS reactor runs for SnMoS varying modes of pretreatment.

|  | S.A.* ($m^2/g$) | percent conversion | HDS rate ($\times 10^{-8}$) | butane | 1-butene | trans 2-butene | cis 2-butene | notes[b] |
|---|---|---|---|---|---|---|---|---|
| SnMoS | 70/13 | 20m 8.37 | 0.72 | 1.52 | 38.80 | 28.56 | 31.12 | $MoS_2$ |
|  |  | 10h 3.80 | 0.45 | — | 42.13 | 25.02 | 32.85 |  |
| He/400/reactor | 70/19 | 20m 11.86 | 1.35 | 1.40 | 31.29 | 34.38 | 32.93 | $MoS_2$ |
|  |  | 6h 6.12 | 0.70 | 2.12 | 35.92 | 31.11 | 30.85 |  |
| He,$H_2$/400/reactor | 70/26 | 20m 13.99 | 0.83 | 2.38 | 24.29 | 33.24 | 40.08 | $MoS_2$ |
|  |  | 10h 2.86 | 0.17 | — | 39.69 | 26.84 | 33.47 |  |
| $H_2$/400/reactor | 70/14 | 8h 2.31 | 0.79 | 4.47 | 48.78 | 21.31 | 25.44 | $Mo_6S_8$ |
| $H_2$/400/3h | 20/7.0 | 20m 3.15 | 0.71 | — | 55.76 | 9.83 | 34.41 | $Mo_6S_8$ |
|  |  | 10h 2.10 | 0.46 | — | 58.36 | 19.00 | 22.64 |  |
| $H_2$/400/8h | 22/13.8 | 20m 18.46 | 2.05 | — | 30.66 | 34.48 | 34.86 | $MoS_2$ |
|  |  | 10h 1.62 | 0.18 | — | 41.98 | 27.10 | 30.92 |  |
| $H_2$/400/20h | 6.6/5.3 | 20m 7.91 | 2.35 | — | 34.80 | 28.81 | 36.39 | $MoS_2$ |
|  |  | 10h 1.34 | 0.40 | — | 44.91 | 22.62 | 32.48 |  |
| $H_2$/500/24h | 5.0/4.4 | 20m 2.24 | 1.00 | — | 54.31 | 17.11 | 28.58 | $Mo_6S_8$ |
|  |  | 10h 0.79 | 0.36 | — | 55.76 | 17.40 | 26.84 |  |
| $SnMo_6S_8$[c] | 0.388 | 20m 1.90 | 3.57 | 0.6 | 60.7 | 22.6 | 16.1 | $Mo_6S_8$ |
|  |  | 10h 1.72 | 3.24 | 0.5 | 63.1 | 21.3 | 15.1 |  |

[a]Surface areas reported before and after HDS runs.
[b]$MOS_2$ and $Mo_6S_8$ denote major products detected by XPS and Raman.
[c]Data from reference 2b.

TABLE 3

Summary of HDS reactor rns for MMoS materials.

| | S.A.* (m²/g) | percent conversion | HDS rate (×10⁻⁸) | butane | 1-butene | trans 2-butene | cis 2-butene | notes[b] |
|---|---|---|---|---|---|---|---|---|
| SnMoS | 70/13 | 20m 8.37 | 0.72 | 1.52 | 38.80 | 28.56 | 31.12 | $MoS_2$ |
| | | 10h 3.80 | 0.45 | — | 42.13 | 25.02 | 32.85 | |
| SnMoS/400/3h | 20/7.0 | 20m 3.15 | 0.71 | — | 55.76 | 9.83 | 34.41 | $Mo_6S_8$ |
| | | 10h 2.10 | 0.46 | — | 58.36 | 19.00 | 22.64 | |
| $SnMo_6S_8$[c] | 0.388 | 20m 1.90 | 3.57 | 0.6 | 60.7 | 22.6 | 16.1 | $Mo_6S_8$ |
| | | 10h 1.72 | 3.24 | 0.5 | 63.1 | 21.3 | 15.1 | |
| CoMoS/400/6h | 30/20.8 | 20m 13.48 | 4.23 | 2.61 | 26.24 | 35.39 | 35.76 | $MoS_2$ |
| | | 10h 17.70 | 5.55 | 3.10 | 26.72 | 33.40 | 36.78 | |
| $Co_{1.5}Mo_6S_8$[a] | 0.150 | 20m 2.06 | 3.16 | 0.4 | 46.4 | 34.2 | 19.0 | $Mo_6S_8$ |
| | | 10h 0.54 | 0.82 | — | 42.2 | 45.6 | 12.2 | |
| NiMoS | 94/11.3 | 20m 75.41 | 13.75 | 12.33 | 20.54 | 35.63 | 31.50 | $MoS_2$ |
| | | 10h 47.00 | 8.57 | 6.55 | 21.38 | 35.38 | 36.69 | |
| NiMoS/400/6h | 14.7/9.7 | 20m 79.42 | 9.92 | 11.41 | 20.05 | 33.40 | 35.14 | $MoS_2$ |
| | | 10h 62.02 | 7.75 | 7.21 | 21.66 | 33.90 | 37.23 | |
| $Ni_{1.6}Mo_6S_8$[c] | 0.144 | 20m 2.00 | 4.22 | 0.9 | 35.4 | 40.1 | 23.6 | $Mo_6S_8$ |
| | | 10h 0.71 | 1.50 | — | 35.0 | 46.4 | 18.6 | |
| $Co_{.25}$—$Mo_1$—S[c] | 10.83 | 20m 1.94 | 7.37 | 1.3 | 35.9 | 38.0 | 24.8 | $MoS_2$ |
| | | 10h 0.77 | 2.92 | 1.5 | 36.4 | 41.1 | 21.0 | |
| 1000° C. $MoS_2$[c] | 3.40 | 20m 2.22 | 2.67 | 2.4 | 41.2 | 32.7 | 23.7 | $MoS_2$ |
| | | 10h 0.76 | 0.92 | 1.8 | 46.0 | 34.9 | 17.3 | |

[a]Surface areas reported before and after HDS runs in cases with two values and after HDS if one value.
[b]$MoS_2$ and $Mo_6S_8$ denote major products detected by XPS and Raman.
[c]Data from reference 2b.

We claim:

1. Chemical compositions comprising:
$M^{n+}_{2x/n}(L_6S_8)S_x$
where L is molybdenum or tungsten and M is ternary metal selected from the group consisting of lithium, sodium, potassium, rubidium, cesium, magnesium, calcium, strontium, barium, titanium, vanadium, chromium, manganese, iron, ruthenium, osmium, cobalt, iridium, nickel, palladium, platinum, copper, zinc, silver, gold, cadmium, mercury, gallium, indium, thallium, tin, lead, bismuth, scandium, lanthanum, yttrium, cerium, praseodymium, neodymium, samarium, europium, gadolinium, terbium, dysprosium, erbium thulium, holmium, ytterbium, and lutetium; wherein n is 1, 2, or 3; and x is from 0.5 to 1.5; and wherein the chemical structure is amorphous.

2. Chemical compositions of claim 1 where M is a ternary metal selected from the group consisting of sodium, tin, cobalt, nickel, lead, lanthanum, and holmium.

3. The chemical compositions of claim 1 wherein x is from 1 to 1.5.

4. The chemical compositions of claim 1 wherein L is molybdenum.

5. The chemical compositions of claim 1 comprising:
$M^{n+}_{2x/n}(Mo_6S_8)S_x \cdot yR$
where M is selected from the group consisting of sodium, tin, cobalt, nickel, lead, lanthanum, and holmium; where R is selected from the group consisting of methanol, acetonitrile, tetrahydrofuran, propionitrile, butanol, propanol, and amines; wherein n is 1, 2, or 3; x is from 0.5 to 1.5 and y is 4 to 5.

6. The chemical compositions of claim 1 wherein L is tungsten.

7. A catalyst comprising a substrate and chemical compounds deposited onto the substrate, wherein the chemical compounds comprise:
$M^{n+}_{2x/n}(L_6S_8)S_x$
where L is molybdenum or tungsten; M is selected from the group consisting of sodium, tin, cobalt, nickel, lead, lanthanum, and holmium; n is 1, 2, or 3; and x is from 1 to 1.5;
and wherein the chemical compounds are amorphous.

8. A method for making an amorphous chemical composition having the formula:
$M^{n+}_{2x/n}(L_6S_8)S_x$
where L is molybdenum or tungsten; M is selected from the group consisting of sodium, tin, cobalt, nickel, lead, lanthanum, and holmium; n is 1, 2, or 3; and x is from 1 to 1.5, comprising the following steps:
reacting $L_6Cl_{12}$ and an alkali metal sulfide in a solvent to produce a first reaction product and an alkali metal chloride;
filtering the first reaction product to separate the first reaction product from the solvent;
extracting the first reaction product with a second solvent to remove the alkali metal chloride to form a second reaction product;
reacting the second reaction product with a M metal salt to form a third reaction product;
extracting the third reaction product with a solvent to remove metal salts and unreacted M metal salts to form a fourth reaction product;
heating the fourth reaction product to form the amorphous chemical composition having the formula $M^{n+}_{2x/n}(L_6S_8)S_x$.

9. A hydrodesulfurization catalyst produced by the steps comprising:
mixing $Na_{2x}(Mo_6S_8)S_x \cdot yR$ where R is selected from the group consisting of methanol, acetonitrile, tetrahydrofuran (THF), propionitrile, butanol, propanol, and amines and wherein n is 1, 2, or 3; x is from 0.5 to 1.5, and y is 4 to 5; a M metal salt where M is selected form the group consisting of sodium, tin, cobalt, nickel, lead, lanthanum, and holmium; and a solvent;
reacting the mixture to produce a reaction product;
separating the reaction product from the solvent extracting the reaction product;
and drying the reaction product to produce amorphous $M^{n+}_{2x/n}(Mo_6S_8)S_x \cdot yR$.

10. The catalyst of claim 9, wherein said catalyst is subjected to a reducing hydrogen gas flow.

11. The catalyst of claim 9, wherein said catalyst is heated under flowing hydrogen gas.

12. The catalyst of claim 9, wherein said catalyst is pretreated comprising the steps of:
- segregating 40–100 mesh particle size powders of said catalyst;
- loading the powder into an alumina boat inside a quartz tube;
- heating said powder under flowing hydrogen gas;
- cooling said powder under flowing hydrogen gas.

13. The catalyst of claim 9, wherein said catalyst is subjected to a flow of helium.

14. The catalyst of claim 9, wherein said catalyst is subjected to a mixture of hydrogen and helium gas flow.

* * * * *